(12) United States Patent
Huang et al.

(10) Patent No.: US 10,331,022 B2
(45) Date of Patent: Jun. 25, 2019

(54) LIGHT SOURCE MODULE AND PROJECTION APPARATUS

(71) Applicant: Coretronic Corporation, Hsin-Chu (TW)

(72) Inventors: Kuan-Ta Huang, Hsin-Chu (TW); Ming-Tsung Weng, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 15/853,982

(22) Filed: Dec. 26, 2017

(65) Prior Publication Data

US 2018/0188640 A1    Jul. 5, 2018

(30) Foreign Application Priority Data

Dec. 30, 2016   (CN) .......................... 2016 1 1253468

(51) Int. Cl.
*G03B 21/20*       (2006.01)
*G02B 26/00*      (2006.01)
(Continued)

(52) U.S. Cl.
CPC .............. *G03B 21/204* (2013.01); *F21V 9/40* (2018.02); *F21V 14/08* (2013.01); *G02B 26/008* (2013.01);
(Continued)

(58) Field of Classification Search
CPC ................ G03B 21/204; G03B 21/208; G03B 21/2013; G03B 21/2033; G03B 21/2053;
(Continued)

(56) References Cited

U.S. PATENT DOCUMENTS 9,644,803 B2 * 5/2017 Kasugai .................... F21K 9/64
2012/0320344 A1 * 12/2012 Okumura ............. G03B 21/204
353/98

(Continued)

FOREIGN PATENT DOCUMENTS

CN        102809882       12/2012
CN        103246146        8/2013
(Continued)

*Primary Examiner* — Sultan Chowdhury
(74) *Attorney, Agent, or Firm* — JCIPRNET (57) ABSTRACT

A light source module includes a solid-state light source and a wavelength conversion wheel. The solid-state light source provides a light beam. The wavelength conversion wheel has a wavelength conversion region and a penetration region. The wavelength conversion region converts the light beam to generate a conversion beam. A substrate of the wavelength conversion wheel includes a first surface and a second surface opposite to the first surface. The wavelength conversion region includes a first conversion region and a second conversion region. The first and the second conversion regions are respectively located on the first and the second surfaces. The penetration region is connected to the first and the second surfaces. The wavelength conversion region and the penetration region are symmetrically disposed by using a symmetry point of the substrate as a reference point. A projection apparatus including the light source module is disclosed.

16 Claims, 8 Drawing Sheets

(51) Int. Cl.
  *H04N 9/31* (2006.01)
  *F21V 9/40* (2018.01)
  *F21V 14/08* (2006.01)
  *G03B 33/08* (2006.01)
  *G02B 27/14* (2006.01)
(52) U.S. Cl.
  CPC ........... *G02B 27/141* (2013.01); *G03B 33/08* (2013.01); *H04N 9/3155* (2013.01); *H04N 9/3197* (2013.01)
(58) Field of Classification Search
  CPC .. H04N 9/3111; H04N 9/3114; H04N 9/3117; H04N 9/3161; H04N 9/3164
  See application file for complete search history.

(56) References Cited

U.S. PATENT DOCUMENTS

| | | | |
|---|---|---|---|
| 2014/0211170 A1* | 7/2014 | Kitano | G03B 21/204 353/31 |
| 2015/0098065 A1* | 4/2015 | Tanaka | G03B 21/2013 353/84 |
| 2015/0237340 A1* | 8/2015 | Simon | H04N 9/3114 348/51 |
| 2016/0165194 A1* | 6/2016 | Hartwig | G02B 26/008 353/31 |
| 2017/0082912 A1* | 3/2017 | Wakabayashi | G02B 27/283 |

FOREIGN PATENT DOCUMENTS

| | | |
|---|---|---|
| CN | 104049446 | 9/2014 |
| CN | 104765240 | 7/2015 |

\* cited by examiner

LIGHT SOURCE MODULE AND PROJECTION APPARATUS

CROSS-REFERENCE TO RELATED APPLICATION

This application claims the priority benefit of China application serial no. 201611253468.7, filed on Dec. 30, 2016. The entirety of the above-mentioned patent application is hereby incorporated by reference herein and made a part of this specification.

BACKGROUND OF THE INVENTION

1. Field of the Invention

The invention generally relates to an optical module and optical apparatus, in particular, to a light source module and a projection apparatus.

2. Description of Related Art

With the development of science and technology, solid state light sources such as laser diodes or light emitting diodes are widely used as light sources needed by projection apparatuses. For example, a light-emitting spectrum of a laser diode that is a solid state light source is used as a pure color light source of a projection apparatus, and is stimulated by using, for example, a wavelength conversion material of fluorescent powder, to well provide a light source needed by projection pictures. However, the current wavelength conversion material has the problems that the density is too high relative to the light source and conversion efficiency of the fluorescent powder is poor. Consequently, brightness of the whole projection apparatus is poor. To increase the brightness of the projection apparatus, the current method is generally to further increase power of the laser diode or to simultaneously use multiple groups of wavelength conversion materials. However, when the power of the laser diode is increased, heat dissipation of the projection apparatus is poor, resulting in that the conversion efficiency of the fluorescent powder cannot be effectively improved. When the multiple groups of wavelength conversion materials are simultaneously used, a volume of the projection apparatus is too bulky, and the apparatus does not satisfy demands of actual application.

The information disclosed in this "Description of Related Art" section is only for enhancement understanding of the background of the invention and therefore it may contain information that does not form the prior art that is already known to a person of ordinary skill in the art. Furthermore, the information disclosed in this "Description of Related Art" section does not mean that one or more problems to be solved by one or more embodiments of the invention were acknowledged by a person of ordinary skill in the art.

SUMMARY OF THE INVENTION

The invention provides a light source module and a projection apparatus, to improve light conversion efficiency and reduce occupation space.

Other objectives and advantages of the invention may be further understood from the technical features disclosed in the invention.

In order to achieve one, some, or all of the aforementioned objectives or other objectives, an embodiment of the invention provides a light source module, which is configured to provide an illumination beam. The light source module includes a first solid-state light source, a second solid-state light source, and a wavelength conversion wheel. The first solid-state light source is configured to provide a first light beam. The second solid-state light source is configured to provide a second light beam. The wavelength conversion wheel is disposed on transmission paths of the first light beam and the second light beam. The wavelength conversion wheel has a wavelength conversion region and a penetration region. The penetration region is configured to allow the first light beam and the second light beam to pass through. The wavelength conversion region is configured to convert the light beams to generate a conversion beam. The wavelength conversion wheel includes a substrate. The substrate includes a first surface and a second surface opposite to the first surface. The wavelength conversion region includes a first conversion region and a second conversion region. The first conversion region and the second conversion region are respectively located on the first surface and the second surface. The penetration region is connected to the first surface and the second surface. The wavelength conversion region and the penetration region are symmetrically disposed by using a symmetry point of the substrate as a reference point.

In order to achieve one, some, or all of the aforementioned objectives or other objectives, another embodiment of the invention provides a projection apparatus, including a light source module, an imaging element, and a projection lens. The light source module is configured to provide an illumination beam. The light source module includes a first solid-state light source, a second solid-state light source, and a wavelength conversion wheel. The first solid-state light source is configured to provide a first light beam. The second solid-state light source is configured to provide a second light beam. The wavelength conversion wheel is disposed on transmission paths of the first light beam and the second light beam. The wavelength conversion wheel has a wavelength conversion region and a penetration region. The penetration region is configured to allow the first light beam and the second light beam to pass through. The wavelength conversion region is configured to convert the light beams to generate a conversion beam. The wavelength conversion wheel includes a substrate. The substrate includes a first surface and a second surface opposite to the first surface. The wavelength conversion region includes a first conversion region and a second conversion region. The first conversion region and the second conversion region are respectively located on the first surface and the second surface. The penetration region is connected to the first surface and the second surface. The wavelength conversion region and the penetration region are symmetrically disposed by using a symmetry point of the substrate as a reference point. The light source module provides the illumination beam by operating the first solid-state light source, the second solid-state light source, and the wavelength conversion wheel. The imaging element is disposed on a transmission path of the illumination beam, and is configured to convert the illumination beam to an image beam. The projection lens is disposed on a transmission path of the image beam, and is configured to project the image beam onto a projection target.

Based on the foregoing, embodiments of the invention have at least one of the following advantages or effects. In an example embodiment of the invention, a light source module includes a solid-state light source and a wavelength conversion wheel. The wavelength conversion wheel has a wavelength conversion region and a penetration region. The wavelength conversion wheel includes a substrate. Moreover, the wavelength conversion region and the penetration region are symmetrically disposed by using a symmetry point of the substrate as a reference point. Therefore, light conversion efficiency of the light source module may be improved, and occupation space of the light source module in a projection apparatus may be reduced.

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
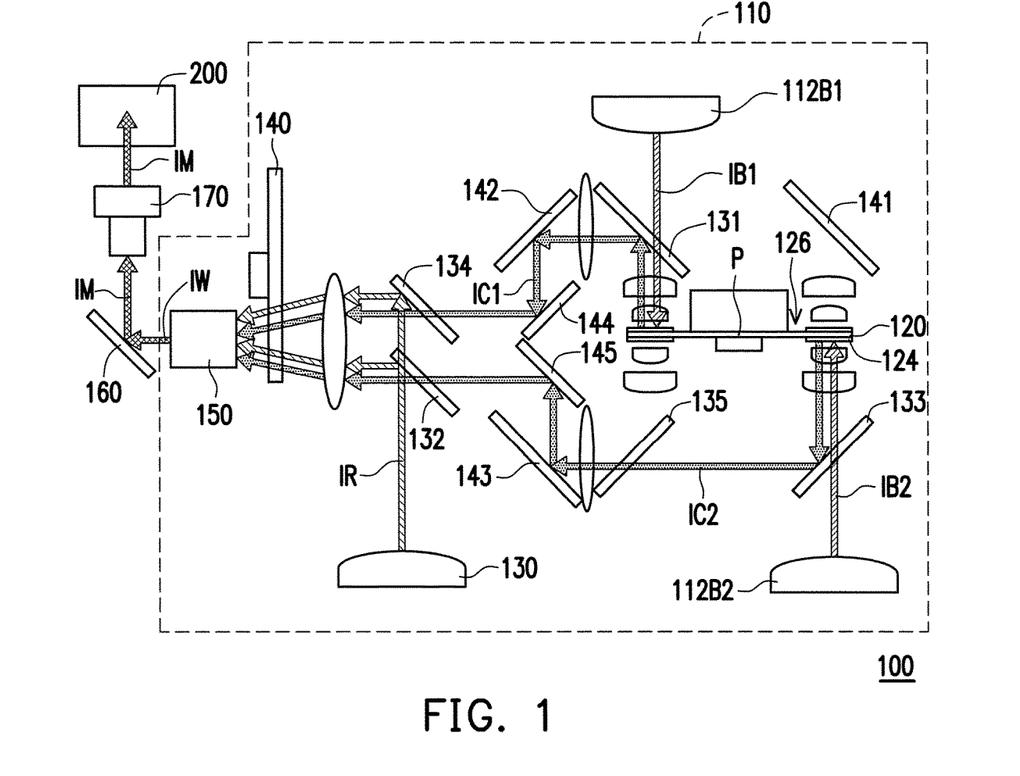
FIG. 1 is a schematic diagram of a projection apparatus in a first state according to an embodiment of the invention.

FIG. 1 is a schematic diagram of a projection apparatus in a first state according to an embodiment of the invention. The first state refers to a state in which a first solid-state light source 112B1 and a second solid-state light source 112B2 simultaneously transmit a first light beam IB1 and a second light beam IB2 to a wavelength conversion region 124 of a wavelength conversion wheel 120. Referring to FIG. 1, in the embodiment, a projection apparatus 100 includes a light source module 110, an imaging element 160, and a projection lens 170. In the embodiment, the light source module 110 is configured to provide an illumination beam IW. The imaging element 160 is disposed on a transmission path of the illumination beam IW. The imaging element 160 is configured to convert the illumination beam IW to an image beam IM. The projection lens 170 is disposed on a transmission path of the image beam IM. The projection lens 170 is configured to project the image beam IM onto a projection target 200, for example, a screen, a plane, or other suitable projection targets.

In the embodiment, the imaging element 160 is, for example, a reflective light modulator such as a liquid crystal on silicon panel (LCoS panel), a digital micro-mirror device (DMD), or the imaging element 160 may be a transmissive light modulator such as a transparent liquid crystal panel, an electro-optical modulator, a maganeto-optic modulator, an acousto-optic modulator (AOM). A form and a type of the imaging element 160 are not limited by the invention. In the embodiment, for a method of converting or modulating the illumination beam IW to the image beam IM by the imaging element 160, detailed steps and an implement manner are acknowledged by a person skilled in the art, therefore, the descriptions thereof are omitted herein.

In the embodiment, the projection lens 170 is, for example, a combination including one or more optical lens that have a diopter, for example, a combination including double concave lenses, double convex lenses, a concave lens and a convex lens, a convex lens and a concave lens, a plate lens and a convex lens, a meniscus lens, a plate lens and a concave lens, and a combination of the aforementioned lens. In an embodiment, the projection lens 170 may also include a convex reflector, a concave reflector, and a plate reflector, and project the image beam IM onto the project target 200 in a manner of reflection. A form and a type of the projection lens 170 are not limited by the invention.

In the embodiment, the light source module 110 includes the first solid-state light source 112B1, the second solid-state light source 112B2, the wavelength conversion wheel 120, a red light source 130, a first light combining element 132, a second light combining element 134, a filter wheel 140, a light homogenizing element 150, multiple light combining elements 131, 133, and 135, and multiple reflective elements 141, 142, 143, 144, and 145. Specifically, in the embodiment, the first solid-state light source 112B1 is configured to provide the first light beam IB1. The second solid-state light source 112B2 is configured to provide the second light beam IB2. The wavelength conversion wheel 120 is, for example, a phosphor wheel, and is disposed on transmission paths of the first blue light beam IB1 and the second blue light beam IB2. The wavelength conversion wheel 120 has the wavelength conversion region 124 and a penetration region 126. The penetration region 126 is configured to allow the first light beam IB1 and the second light beam IB2 to pass through. The wavelength conversion region 124 is configured to convert the first light beam IB1 and the second light beam IB2 to respectively generate a first conversion beam IC1 and a second conversion beam IC2. In the embodiment, the first solid-state light source 112B1 and the second solid-state light source 112B2 are both blue light sources. The first light beam IB1 is a first blue light beam, and the second light beam IB2 is a second blue light beam.

A transmission direction of the first blue light beam IB1 is opposite to a transmission direction of the second blue light beam IB2. The transmission direction of the first blue light beam IB1 is parallel to the transmission direction of the second blue light beam IB2. In the embodiment, a light source used in the light source module 110 is, for example, a laser diode (LD), a light emitting diode (LED), an organic light-emitting diode (OLED), LD array, LED array, or OLED array. Any light source that meets a volume requirement according to an actual design may be implemented, and the invention is not limited thereto.

Figure 2:
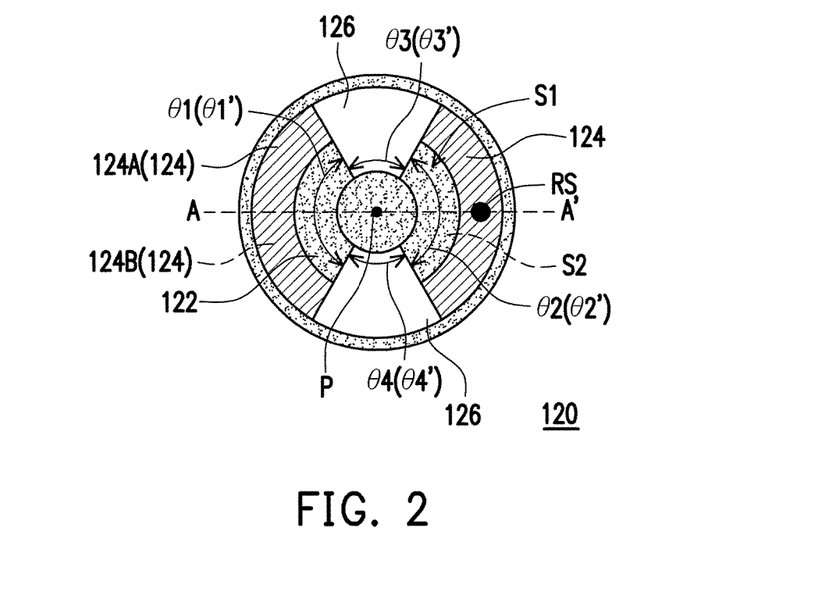
FIG. 2 is a schematic diagram of a wavelength conversion wheel in the first state according to the embodiment of FIG. 1.

FIG. 2 is a schematic diagram of the wavelength conversion wheel in the first state according to the embodiment of FIG. 1. Referring to FIG. 1 and FIG. 2, the wavelength conversion wheel 120 includes a substrate 122. The substrate 122 includes a first surface S1 and a second surface S2 opposite to the first surface S1. The wavelength conversion region 124 and the penetration region 126 are distributed on the substrate 122. The wavelength conversion region 124 includes a first conversion region 124A and a second conversion region 124B, which are respectively located on the first surface S1 and the second surface S2. The first conversion region 124A corresponds to the first blue light source 112B1, and the second conversion region 124B corresponds to the second blue light source 112B2. On the first surface S1, a total of central angles θ1 and θ2 of the first conversion region 124A is greater than a total of central angles θ3 and θ4 of the penetration region 126 (θ1+θ2>θ3+θ4). Moreover, on the second surface S2, a total of central angles θ1' and θ2' of the second conversion region 124B is greater than a total of central angles θ3' and θ4' of the penetration region 126 (θ1'+θ2'>θ3'+θ4'). In this way, a probability of transmitting the first blue light beam IB1 and the second blue light beam IB2 to the wavelength conversion region 124 can be increased, so that light intensities of the first conversion beam IC1 and the second conversion beam IC2 can be increased. The penetration region 126 is connected to the first surface S1 and the second surface S2, and a glass sheet or a diffusion sheet may be disposed in the penetration region 126, or the penetration region 126 is a hole disposed in the substrate 122. This is not limited in the invention.

Figure 5:
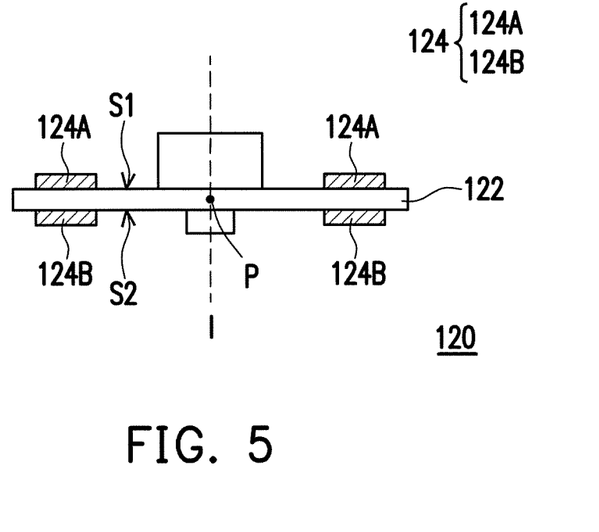
FIG. 5 is a schematic cross-sectional view of the wavelength conversion wheel along a line A-A' according to the embodiment of FIG. 2.

FIG. 5 is a schematic cross-sectional view of the wavelength conversion wheel along a line A-A' according to the embodiment of FIG. 2. Refer to FIG. 1, FIG. 2, and FIG. 5. The wavelength conversion region 124 and the penetration region 126 are symmetric by using a symmetry point P of the substrate 122 as a reference point, and the light source module 110 provides the illumination beam IW by operating the first blue light source 112B1, the second blue light source 112B2, and the wavelength conversion wheel 120. For example, referring to FIG. 5, in the embodiment, using a reference line I passing through the symmetry point P as an example, the reference line I is parallel to a transmission direction of the first blue light beam IB1 emitted from the first blue light source 112B1 and a transmission direction of the second blue light beam IB2 emitted from the second blue light source 112B2. A side of the wavelength conversion wheel 120 has a part of the wavelength conversion region 124 which is the first conversion region 124A, the opposite side of the wavelength conversion wheel 120 has the other part of the wavelength conversion region 124 which is the second conversion region 124B, and areas and shapes of the two wavelength conversion regions 124 on two sides of the wavelength conversion wheel 120 are the same. A side of the wavelength conversion wheel 120 has a part of the penetration region 126, the opposite side of the wavelength conversion wheel 120 has the other part of the penetration region 126, and areas and shapes of the two penetration regions 126 are the same, as shown in FIG. 2. In this way, the first blue light beam IB1 and the second blue light beam IB2 can simultaneously transmits to the two wavelength conversion region 124 or the two penetration region 126, so that the light intensities of the first conversion beam IC1 and the second conversion beam IC2 that are converted from the two blue light beams IB1, IB2 of the two blue light sources 112B1 and 112B2 in the light source module 110 are about equal to light intensities of the first blue light beam IB1 and the second blue light beam IB2 from the two blue light sources 112B1 and 112B2 in the light source module 110.

In addition, referring to FIG. 1, FIG. 2, and FIG. 5, in the embodiment, on the first surface S1, the first conversion region 124A is rotationally symmetric by using the reference line I as a benchmark, and the penetration region 126 is rotationally symmetric by using the reference line I as a benchmark. The reference line I is parallel to the transmission directions of the first blue light beam IB1 and the second blue light beam IB2. The second conversion region 124B is also rotationally symmetric by using the reference line I as a benchmark. For example, the embodiment of FIG. 1 to FIG. 5 shows that two sub-regions of the first conversion region 124A are disposed in a rotationally symmetrical arrangement relative to the reference line I, two sub-regions of the second conversion region 124B are disposed in a rotationally symmetrical arrangement relative to the reference line I, and two sub-regions of the penetration region 126 disposed in a rotationally symmetrical arrangement relative to the reference line I. After one sub-region of the first conversion region 124A is irradiated by the first blue light beam IB1, the wavelength conversion wheel 120 rotates 180 degrees relative to the reference line I, and then the other sub-region of the first conversion region 124A on the first surface S1 is adapted to be irradiated by the first blue light beam IB1. After one sub-region of the second conversion region 124B is irradiated by the second blue light beam IB2, the wavelength conversion wheel 120 rotates 180 degrees relative to the reference line I, and then the other sub-region of the second conversion region 124B on the second surface S2 is adapted to be irradiated by the second blue light beam IB2. After one sub-region of the penetration region 126 is irradiated by the first blue light beams IB1 and the other sub-region of the penetration region 126 is irradiated by the second blue light beams IB2, the wavelength conversion wheel 120 rotates 180 degrees relative to the reference line I, and then the other sub-region of the penetration region 126 is adapted to be irradiated by the first blue light beam IB1 and the one sub-region of the penetration region 126 is adapted to be irradiated by the second blue light beams IB2. In other words, when the wavelength conversion wheel 120 rotates 180 degrees relative to the reference line I, a configuration of the conversion region and the penetration region is the same as that before the rotation. In this way, the wavelength conversion wheel 120 in the light source module 110 simultaneously converts the first blue light beam IB1 and the second blue light beam IB2 to the first conversion beam IC1 and the second conversion beam IC2 or simultaneously allows the first blue light beam IB1 and the second blue light beam IB2 to pass through, so as to both improve light conversion efficiency of the light source module 110 and reduce occupation space of the light source module 110 in the projection apparatus.

Figure 3:
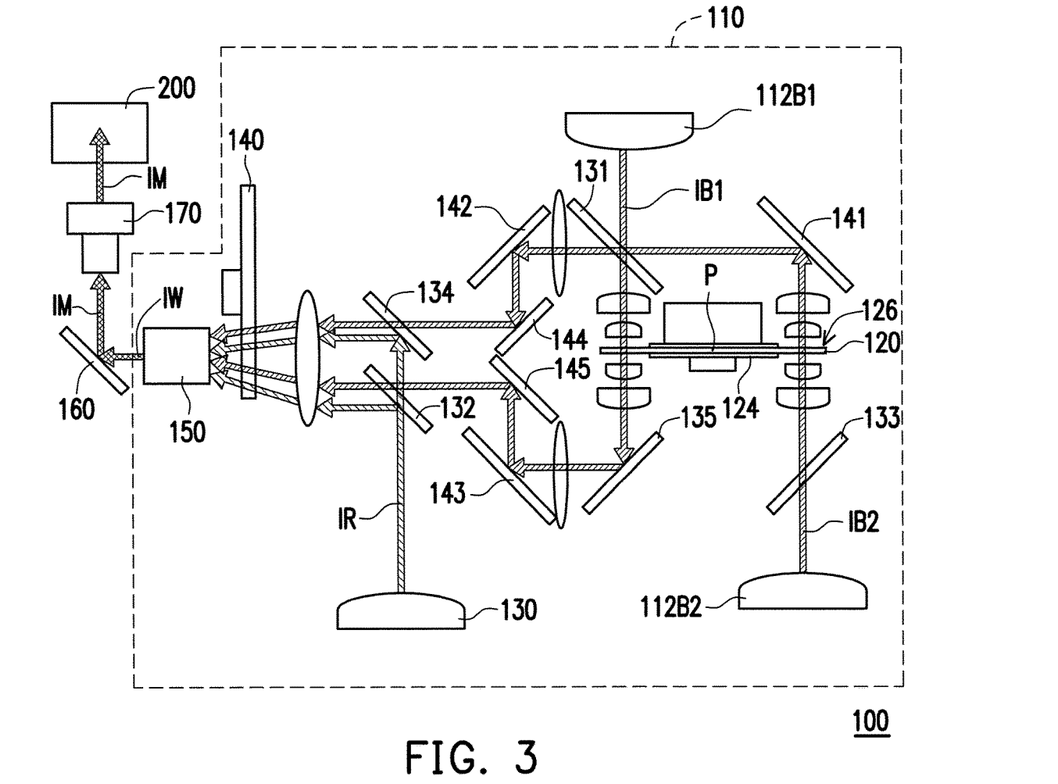
FIG. 3 is a schematic diagram of the projection apparatus in a second state according to the embodiment of FIG. 1.

FIG. 3 is a schematic diagram of the projection apparatus in a second state according to the embodiment of FIG. 1. The second state refers to a state in which the first blue light source 112B1 and the second blue light source 112B2 simultaneously transmit the first blue light beam IB1 and the second blue light beam IB2 to the penetration region 126 in the wavelength conversion wheel 120. In other words, in the second state, the first blue light source 112B1 and the second blue light source 112B2 respectively emit the first blue light beam IB1 and the second blue light beam IB2 at the same time, and the first blue light beam IB1 and the second blue light beam IB2 respectively pass through the two sub-regions of the penetration region 126. Referring to FIG. 1 and FIG. 3, in the embodiment, the reflective elements 143 and 145 are disposed on the transmission path of the first blue light beam IB, and are configured to adjust the transmission paths of the first blue light beam IB1 and the second conversion beam IC2. The reflective elements 141, 142, and 144 are disposed on the transmission path of the second blue light beam IB2, and are configured to adjust the transmission paths of the second blue light beam IB2 and the first conversion beam IC1. In the embodiment, the light combining elements 131, 133, and 135 are, for example, transflective lens (also referred to as dichroic mirror), may reflect a part of a beam transmitted to the lens to a preset direction, and allows the other part of the beam to pass through. The light combining element 131 is disposed on the transmission paths of the first blue light beam IB1 and the second blue light beam IB2, and is configured to combine the second blue light beam IB2 with the first conversion beam IC1. The light combining element 133 is disposed on the transmission path of the second blue light beam IB2, and is configured to allow the second blue light beam IB2 to pass through and reflect the second conversion beam IC2. The light combining element 135 is disposed on the transmission path of the first blue light beam IB1, and is configured to combine the first blue light beam IB1 and the second conversion beam IC2.

In the embodiment, the red light source 130 is configured to provide a red light beam IR. The first light combining element 132 is disposed on transmission paths of the first blue light beam IB1, the second conversion beam IC2, and the red light beam IR, and is configured to allow a part of the red light beam IR to penetrate and reflect the other part of the red light beam IR. The second light combining element 134 is disposed on transmission paths of the second blue light beam IB2, the first conversion beam IC1, and the other part of the red light beam IR. For example, the first light combining element 132 is, for example, a transflective lens that is designed according to a light transmittance and a wavelength of the red light beam IR, and may reflect 50% of the red light beam IR provided by the red light source 130 and allow the other 50% to pass through the first light combining element 132. The first light combining element 132 also allows the first blue light beam IB1 and the second conversion beam IC2 to pass therethrough. The second light combining element 134 is, for example, a total reflection lens that is designed according to the wavelength of the red light beam IR, and may reflect and adjust the other 50% of the red light beam IR that passes through the first light combining element 132 to a transmission path the same as the reflection direction of the first light combining element 132. The second light combining element 134 also allows the second blue light beam IB2 and the first conversion beam IC1 to pass therethrough. In this way, homogeneity of the light source module 110 is increased.

In the embodiment, the filter wheel 140 is, for example, a color filter wheel, is disposed on transmission paths of the first blue light beam IB1, the second blue light beam IB2, the first conversion beam IC1, the second conversion beam IC2, and the red light beam IR, and is configured to receive the first blue light beam IB1, the second blue light beam IB2, the first conversion beam IC1, the second conversion beam IC2, and the red light beam IR. For example, the first conversion beam IC1 and the second conversion beam IC2 may be yellow light beams. The filter wheel 140 may perform filtering in sequence and generate a blue light beam, a red light beam, and a green light beam. The invention is not limited thereto.

In the embodiment, the light homogenizing element 150 is disposed on an optical path between the filter wheel 140 and the imaging element 160. The light homogenizing element 150 is configured to receive the blue light beam, the red light beam, and the green light beam generated by the filter wheel 140, and performs optical homogenization to form the illumination beam IW. The illumination beam IW is output from the light source module 110, to avoid a problem of different brightness on an optical path of the projection apparatus 100. The light homogenizing element 150 is, for example, an integration rod, a fly lens, or a combination or a group of the aforementioned optical elements. This is not limited in the invention.

In the embodiment, quantities and locations of the filter wheel 140, the light homogenizing element 150, the light combining elements 131, 133, and 135, and the reflective elements 141, 142, 143, 144, and 145 are merely for illustration as examples, and do not limit the invention. The quantities and locations of the optical elements may be adjusted according to different optical architectures of the light source module 110.

Refer to FIG. 1 and FIG. 2 again. Specifically, in the embodiment, when the first blue light source 112B1 emits the first blue light beam IB1, and then the light combining element 131 transmits the beam to the first conversion region 124A of the wavelength conversion wheel 120, fluorescent powder on the first conversion region 124A convents the first blue light beam IB1 to the first conversion beam IC1 and reflects the first conversion beam IC1 to the light combining element 131, and a transmission path of the first conversion beam IC1 is adjusted towards the imaging element 160 after the first conversion beam IC 1 is reflected by the light combining element 131 and the reflective elements 142 and 144. Meanwhile, the second blue light source 112B2 emits the second blue light beam IB2, and then the light combining element 133 transmits the beam to the second conversion region 124 of the wavelength conversion wheel 120, fluorescent powder on the second conversion region 124B converts the second blue light beam IB2 to the second conversion beam IC2 and reflects the second conversion beam IC2 to the light combining element 133, and a transmission path of the second conversion beam IC2 is adjusted towards the imaging element 160 after the second conversion beam IC2 is reflected by the light combining element 133 and the reflective elements 143 and 145.

Figure 4:
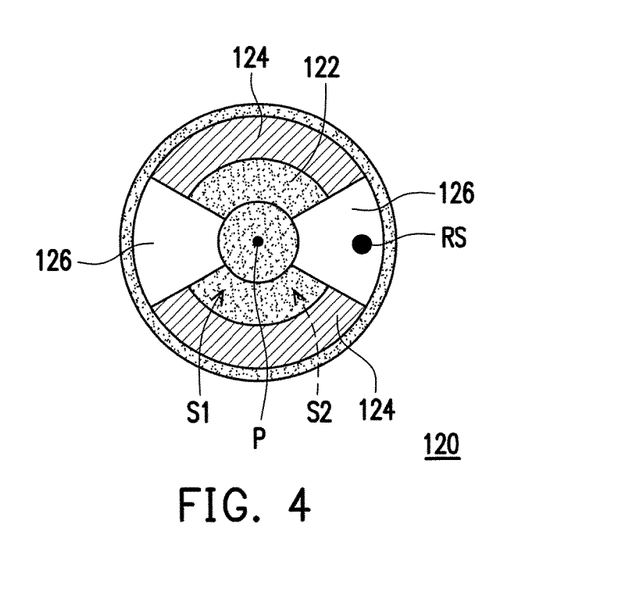
FIG. 4 is a schematic diagram of the wavelength conversion wheel in the second state according to the embodiment of FIG. 3.

FIG. 4 is a schematic diagram of the wavelength conversion wheel in the second state according to the embodiment of FIG. 3. Referring to FIG. 3 and FIG. 4, in the second state, when the first blue light source 112B1 emits the first blue light beam IB1, and then the light combining element 131 transmits the beam to one sub-region of the penetration region 126 of the wavelength conversion wheel 120, a transmission path of the first blue light beam IB1 is adjusted towards the imaging element 160 after the first blue light beam IB1 passes through the wavelength conversion wheel 120 and is reflected by the light combining element 135 and the reflective elements 143 and 145. Meanwhile, when the second blue light source 112B2 emits the second blue light beam IB2, and then the light combining element 133 transmits the beam to the other sub-region of the penetration region 126 of the wavelength conversion wheel 120, a transmission path of the second blue light beam IB2 is adjusted towards the imaging element 160 after the second blue light beam IB2 passes through the wavelength conversion wheel 120 and is reflected by the reflective elements 141, 142, and 144. In this way, conversion efficiency of a laser beam may be increased, and a quantity of optical elements may be reduced to save space.

Figure 6:
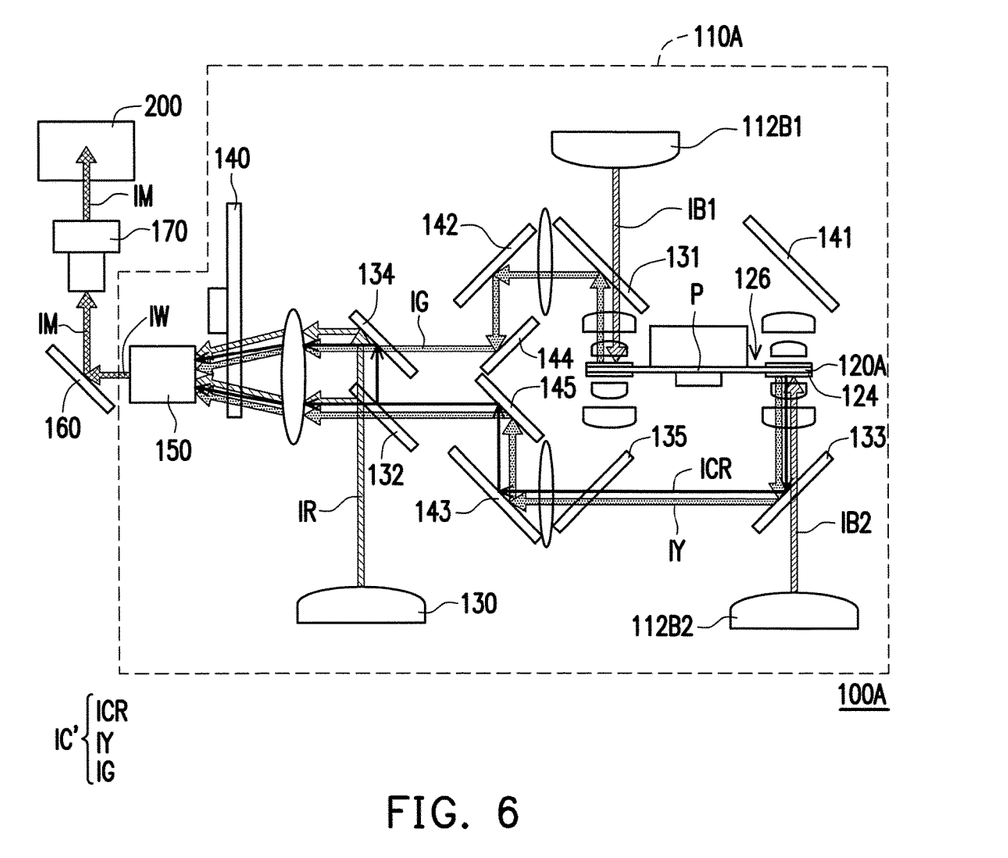
FIG. 6 is a schematic diagram of a projection apparatus in a first state according to another embodiment of the invention.
Figure 7:
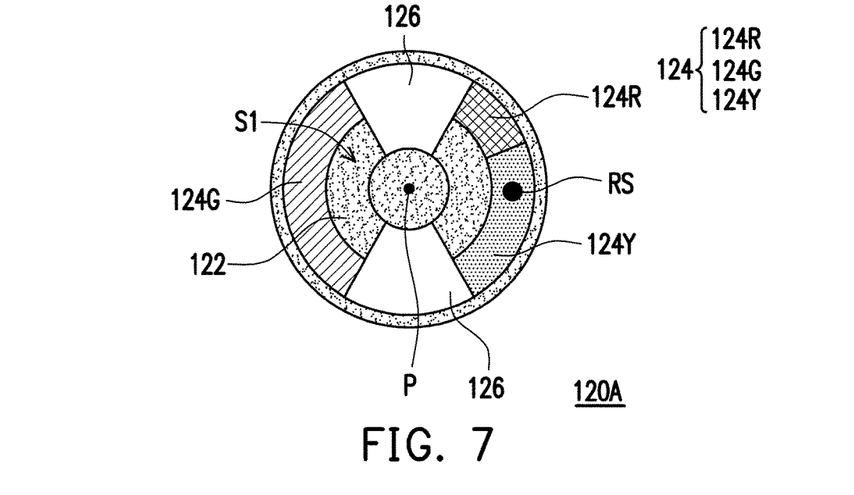
FIG. 7 is a schematic diagram of a wavelength conversion wheel in the first state according to the embodiment of FIG. 6.
Figure 8:
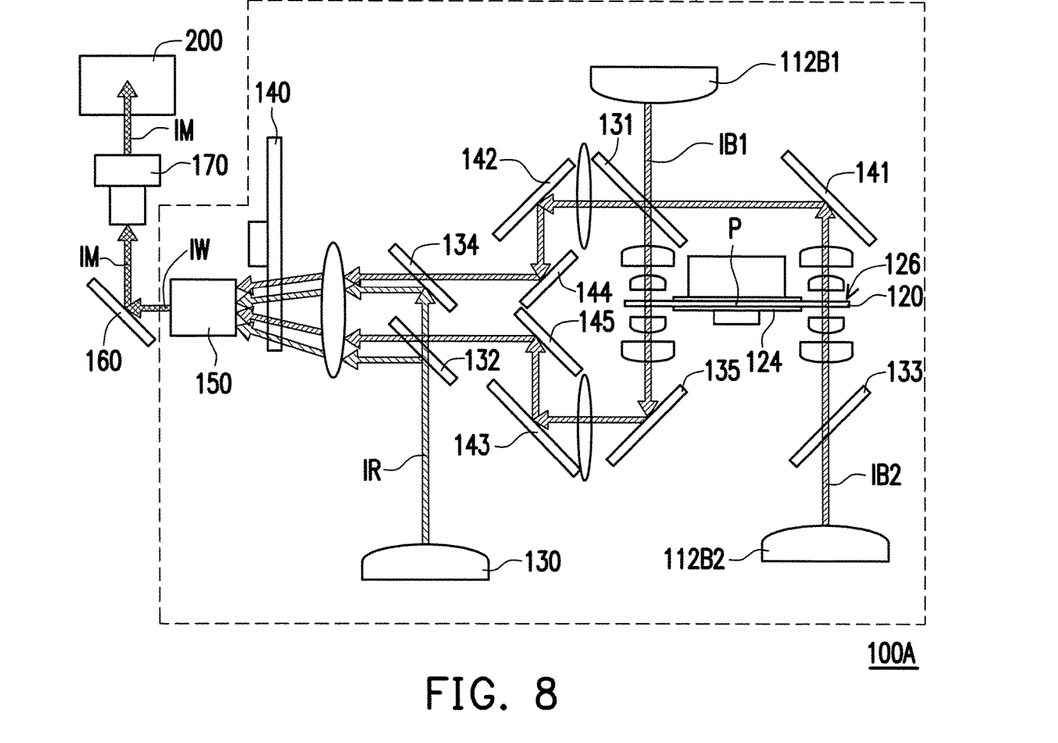
FIG. 8 is a schematic diagram of the projection apparatus in a second state according to the embodiment of FIG. 6.
Figure 9:
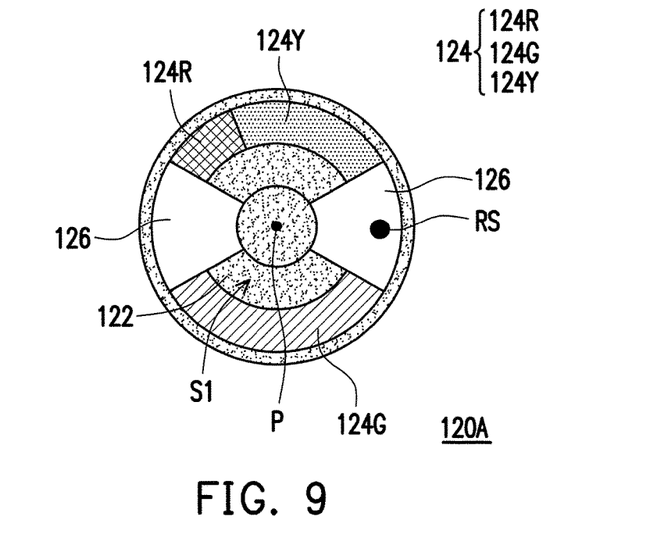
FIG. 9 is a schematic diagram of the wavelength conversion wheel in the second state according to the embodiment of FIG. 8.

FIG. 6 is a schematic diagram of a projection apparatus in a first state according to another embodiment of the invention. FIG. 7 is a schematic diagram of a wavelength conversion wheel in the first state according to the embodiment of FIG. 6. FIG. 8 is a schematic diagram of the projection apparatus in a second state according to the embodiment of FIG. 6. FIG. 9 is a schematic diagram of the wavelength conversion wheel in the second state according to the embodiment of FIG. 8. Referring to FIG. 6 to FIG. 9, the projection apparatus 100A in the embodiment is similar to the projection apparatus 100 in FIG. 1, but a main difference between the two apparatuses is, for example, the wavelength conversion wheel 120A in an illumination system 110A. In the embodiment, a first conversion region 124A of the wavelength conversion wheel 120A includes at least two different wavelength conversion materials to convert beams having different wavelengths. Moreover, the wavelength conversion region 124 is configured to convert a first blue light beam IB1 and a second blue light beam IB2 to generate a red light beam and a yellow light beam. In other words, in the embodiment, a conversion beam IC' that is generated by the wavelength conversion wheel 120A by means of conversion may have the red light beam and the yellow light beam. Therefore, a light homogenizing element 150 may directly receive the blue light beam IB1, the second blue light beam IB2, the red light beam, and the yellow light beam from reflective elements 144 and 145, homogenizes the light beams and output a beam to an imaging element 160. However, in an embodiment, there is no need to additionally configure a red light source 130 or a filter wheel 140, and the embodiment refers to FIG. 12, FIG. 13, and subsequent description. However, this is not limited in the invention.

In the embodiment shown in FIG. 6, when the conversion beam IC' is separately transmitted to a second light combining element 134 and a first light combining element 132 by the reflective elements 144 and 145, because the first light combining element 132 is a transreflective lens that is designed according to a wavelength of the red light beam IR and a wavelength of a red light beam ICR of the conversion beam IC', the first light combining element 132 may reflect 50% of the red light beam of the conversion beam IC' and adjust its transmission path, and may allow the other 50% beam to pass through the first light combining element 132. However, the second light combining element 134 is a total reflection lens that is designed according to wavelengths of the red light beam IR and ICR. Therefore, the second light combining element 134 may reflect the other 50% of the red light beam IR that penetrates the first light combining element 132, and adjust the beam to a transmission path the same as a reflection direction of the first light combining element 132. Meanwhile, the second light combining element 134 may reflect the red light beam ICR reflected by the first light combining element 132. In this way, the light source module 110A may provide a better color gamut of red light, and may increase whole brightness of the light source module 110A, so as to achieve a wider color gamut.

Figure 10:
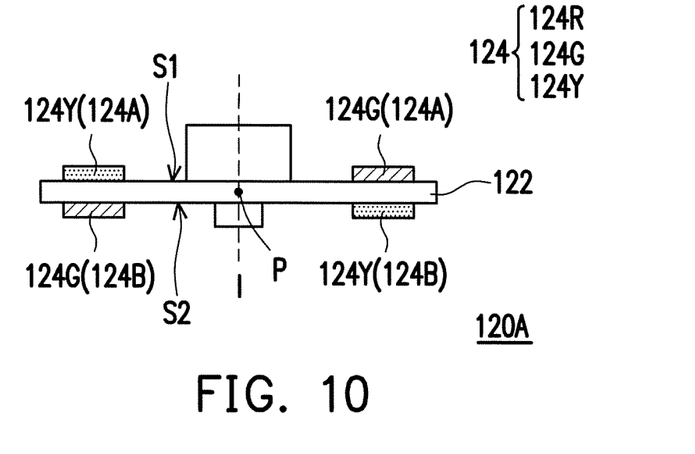
FIG. 10 is a schematic cross-sectional view of the wavelength conversion wheel along a line B-B' according to the embodiment of FIG. 7.
Figure 11:
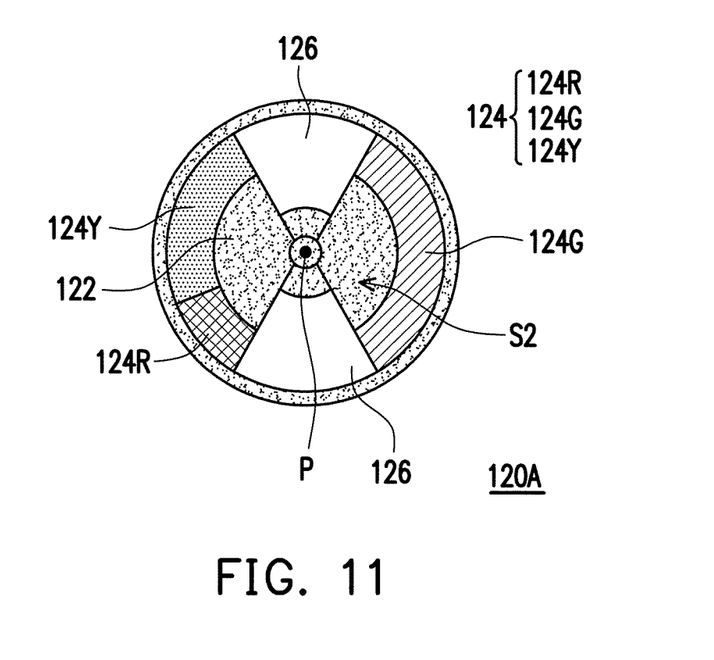
FIG. 11 is a rear view of the wavelength conversion wheel according to the embodiment of FIG. 7.

FIG. 10 is a schematic cross-sectional view of the wavelength conversion wheel along a line B-B' according to the embodiment of FIG. 7. FIG. 11 is a rear view of the wavelength conversion wheel according to the embodiment of FIG. 7. Referring to FIG. 7, FIG. 10, and FIG. 11, in the embodiment, the wavelength conversion wheel 120A is similar to the wavelength conversion wheel 120 in FIG. 2, and only a difference between the two wheels is, for example, a configuration manner of the wavelength conversion region 124. Specifically, in the wavelength conversion wheel 120A of the embodiment, both a first conversion region 124A on a first surface S1 and a second conversion region 124B on a second surface S2 include red light conversion regions 124R, green light conversion regions 124G, and green conversion regions 124Y. The red light conversion region 124R is configured to convert the blue light beams IB1 and IB2 to generate the red light beam ICR, the green light conversion region 124G is configured to convert the blue light beams IB1 and IB2 to generate a green light beam IG, and the yellow light conversion region 124Y is configured to convert the blue light beams IB1 and IB2 to generate a yellow light beam IY. The conversion regions 124R, 124G, and 124Y on the first conversion region 124A and the second conversion region 124B are symmetrically distributed by using a symmetry point P on a substrate 122 as a reference point. For example, in the embodiment, in front view of the first surface S1 of the wavelength conversion wheel 120A (as shown in FIG. 7), the green light conversion region 124G is located on one sub-region of the first conversion region 124A at a left side of the substrate 122, and the red light conversion region 124R and the yellow light conversion region 124Y are simultaneously located on the other sub-region of the first conversion region 124A at a right side of the substrate 122. The two sub-regions have the same size. But a distribution area of the yellow light conversion region 124Y is greater than a distribution area of the red light conversion region 124R. In front view of the second surface S2 of the wavelength conversion wheel 120A (as shown in FIG. 11), the green light conversion region 124G is located on one sub-region of the second conversion region 124B at the right side of the substrate 122, and the red light conversion region 124R and the yellow light conversion region 124Y are simultaneously located on the other sub-region of the second conversion region 124B at the left side of the substrate 122. Therefore, in a side view of the wavelength conversion wheel 120A, the yellow light conversion region 124Y on the first conversion region 124A and the yellow light conversion region 124Y on the second conversion region 124B are symmetric by using the symmetry point P as the reference point, and the green light conversion region 124G on the first conversion region 124A and the green light conversion region 124G on the second conversion region 124B are also symmetric by using the symmetry point P as the reference point, as shown in FIG. 10.

In the embodiment, when the projection apparatus 100A is in a first state, the first blue light beam IB1 and the second blue light beam IB2 are simultaneously transmitted to the green light conversion region 124G, the red light conversion region 124R, or the yellow light conversion region 124Y of the wavelength conversion wheel 120A to generate the conversion beam IC'. In a second state, the wavelength conversion wheel 120A simultaneously allows the first blue light beam IB1 and the second blue light beam IB2 to transmit and pass through the two sub-regions of the penetration region 126. Therefore, light conversion efficiency of the light source module 110A may be increased, and occupation space of the light source module 110A in the projection apparatus 100A may also be reduced.

Figure 12:
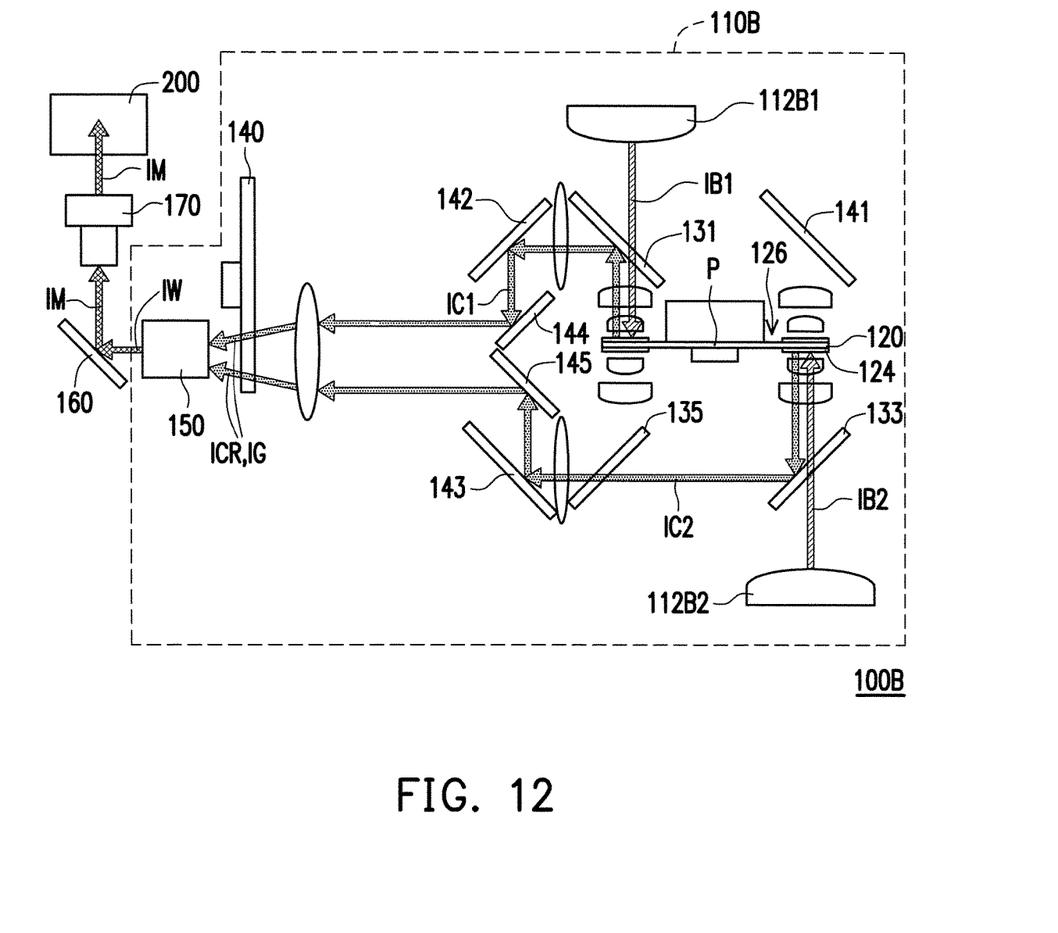
FIG. 12 is a schematic diagram of a projection apparatus in a first state according to still another embodiment of the invention.
Figure 13:
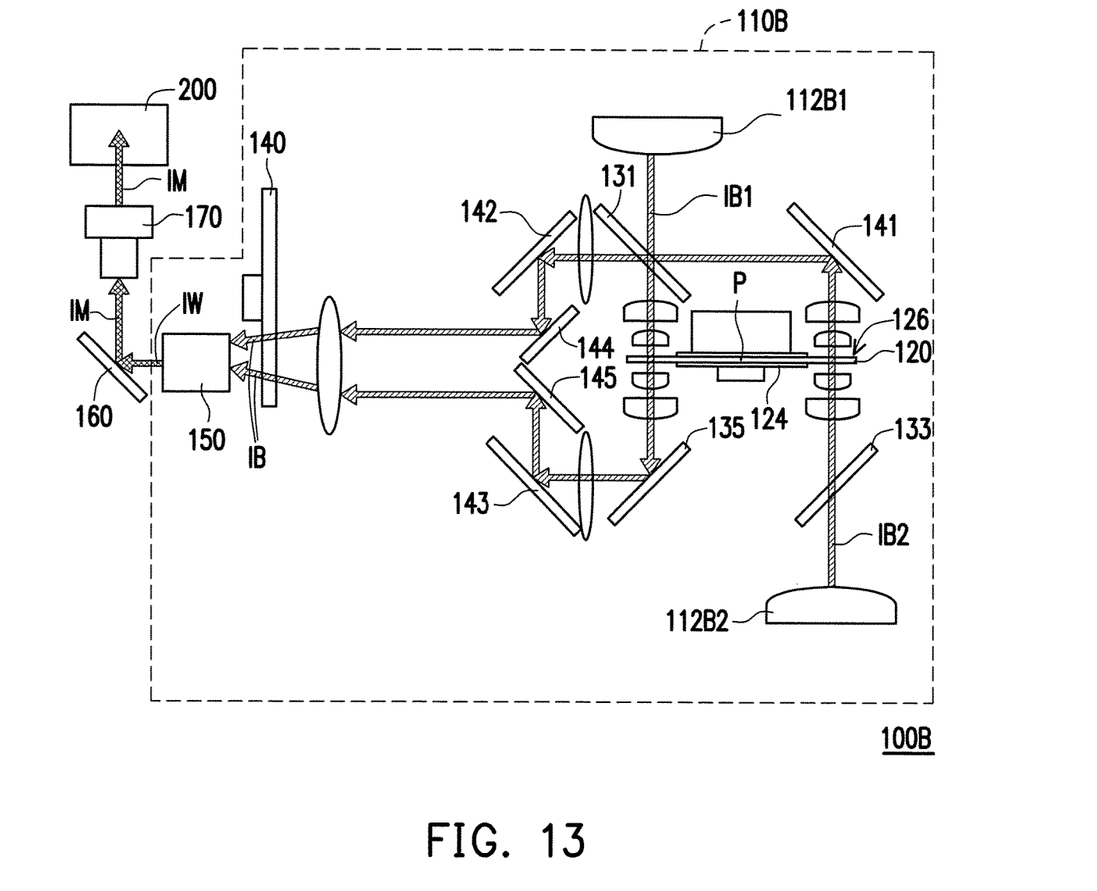
FIG. 13 is a schematic diagram of the projection apparatus in a second state according to the embodiment of FIG. 12.

FIG. 12 is a schematic diagram of a projection apparatus in a first state according to another embodiment of the invention. FIG. 13 is a schematic diagram of the projection apparatus in a second state according to the embodiment of FIG. 12. In the embodiment, the arrangement and elements of the projection apparatus 100B are roughly the same as those of the projection apparatus in FIG. 1 and FIG. 3, and the descriptions thereof are omitted herein. A difference point is that no red light source 130 is provided.

Referring to FIG. 12, in the first state, a first blue light source 112B1 and a second blue light source 112B2 simultaneously transmit beams to a wavelength conversion region 124 of a wavelength conversion wheel 120. In the embodiment, a light source module 110B includes the first blue light source 112B1, the second blue light source 112B2, the wavelength conversion wheel 120, a filter wheel 140, a light homogenizing element 150, multiple light combining elements 131, 133, and 135, and multiple reflective elements 141, 142, 143, 144, and 145. Specifically, in the embodiment, the first blue light source 112B1 is configured to provide a first blue light beam IB1. The second blue light source 112B2 is configured to provide a second blue light beam IB2. The wavelength conversion wheel 120 is, for example, a phosphor wheel, and is disposed on transmission paths of the first blue light beam IB 1 and the second blue light beam IB2. The wavelength conversion wheel 120 has the wavelength conversion region 124 and a penetration region 126. The penetration region 126 is configured to allow the first blue light beam IB1 and the second blue light beam IB2 to pass through. A transmission direction of the first blue light beam IB1 is opposite to a transmission direction of the second blue light beam IB2. The wavelength conversion region 124 is configured to convert the first blue light beam IB1 and the second blue light beam IB2 into a first conversion beam IC1 and a second conversion beam IC2. The first conversion beam IC1 and the second conversion beam IC2 may be yellow light beams (not shown). The first conversion beam IC1 and the second conversion beam IC2 are transmitted to the filter wheel 140 by using the light combining elements and the reflective elements, to generate a red light beam ICR and a green light beam IG by using the filter wheel 140.

Referring to FIG. 13, in the second state, the first blue light source 112B1 and the second blue light source 112B2 simultaneously transmit the first blue light beam IB1 and the second blue light beam IB2 to the penetration region 126 in the wavelength conversion wheel 120, and the first blue light beam IB1 and the second blue light beam IB2 penetrates the penetration region 126. In the embodiment, the reflective elements 143 and 145 and the light combining elements 131, 133, and 135 are configured to adjust transmission paths of the first blue light beam IB1 and the second blue light beam IB2, so that the first blue light beam IB1 and the second blue light beam IB2 are transmitted to the filter wheel 140, and are allowed to penetrate the filter wheel 140 to form a blue light beam IB.

By means of timing switching between the first state and the second state, the red light beam ICR, the green light beam IG, and the blue light beam IB that are formed by the filter wheel 140 are transmitted to the light homogenizing element 150, and are mixed by the light homogenizing element 150 to form an illumination beam IW.

Based on the foregoing, the embodiments of the invention have at least one of the following advantages or effects. In the embodiments of the invention, a light source module includes a blue light source and a wavelength conversion wheel. The wavelength conversion wheel has a wavelength conversion region and a penetration region. The wavelength conversion wheel includes a substrate. Moreover, the wavelength conversion region and the penetration region are respectively symmetric by using a symmetry point of the substrate as a reference point. Therefore, light conversion efficiency of the light source module may be improved, and occupation space of the light source module in a projection apparatus may be reduced.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A light source module, wherein the light source module is configured to provide an illumination beam, and the light source module comprises a first solid-state light source, a second solid-state light source, and a wavelength conversion wheel, wherein
   the first solid-state light source is configured to provide a first light beam;
   the second solid-state light source is configured to provide a second light beam; and
   the wavelength conversion wheel is disposed on transmission paths of the first light beam and the second light beam, and the wavelength conversion wheel has a wavelength conversion region and a penetration region, wherein the penetration region allows the first light beam and the second light beam to pass through, and the wavelength conversion region is configured to convert the first light beam and the second light beam to generate a conversion beam, and the wavelength conversion region further comprises a first wavelength conversion region and a second wavelength conversion region, and the penetration region further comprises a first penetration region and a second penetration region, and the first penetration region and the second penetration region are disconnected from each other,
   wherein one of the first wavelength conversion region and the second wavelength conversion region is disposed between the first penetration region and the second penetration region and located at one side of the first penetration region and the second penetration region,
   the other one of the first wavelength conversion region and the second wavelength conversion region is disposed between the first penetration region and the second penetration region and located at the other side of the first penetration region and the second penetration region,
   wherein
   the wavelength conversion wheel comprises a substrate, wherein the substrate comprises a first surface and a second surface opposite to the first surface, the wavelength conversion region comprises a first conversion region and a second conversion region, the first conversion region and the second conversion region are respectively located on the first surface and the second surface, the penetration region is connected to the first surface and the second surface, and the wavelength conversion region and the penetration region are disposed by using a symmetry point of the substrate as a reference point.

2. The light source module according to claim 1, wherein the first solid-state light source and the second solid-state light source are blue light sources, and the first light beam and the second light beam are respectively a first blue light beam and a second blue light beam.

3. The light source module according to claim 2, further comprising:
   a filter wheel, disposed on transmission paths of the first blue light beam, the second blue light beam, and the conversion beam, and configured to receive the first blue light beam, the second blue light beam, and the conversion beam, wherein the conversion beam is a yellow light beam, and the filter wheel generates a red light beam and a green light beam according to the conversion beam.

4. A light source module, wherein the light source module is configured to provide an illumination beam, and the light source module comprises a first solid-state light source, a second solid-state light source, and a wavelength conversion wheel, wherein
   the first solid-state light source is configured to provide a first light beam;
   the second solid-state light source is configured to provide a second light beam; and
   the wavelength conversion wheel is disposed on transmission paths of the first light beam and the second light beam, and the wavelength conversion wheel has a wavelength conversion region and a penetration region, wherein the penetration region allows the first light beam and the second light beam to pass through, and the wavelength conversion region is configured to convert the first light beam and the second light beam to generate a conversion beam, and the penetration region further comprises a first penetration region and a second penetration region, and the first penetration region and the second penetration region are disconnected from each other, wherein
   the wavelength conversion wheel comprises a substrate, wherein the substrate comprises a first surface and a second surface opposite to the first surface, the wavelength conversion region comprises a first conversion region and a second conversion region, the first conversion region and the second conversion region are respectively located on the first surface and the second surface, the penetration region is connected to the first surface and the second surface, and the wavelength conversion region and the penetration region are disposed by using a symmetry point of the substrate as a reference point,
   wherein, on the first surface, a total of central angles of the first conversion region is greater than a total of central angles of the penetration region, and on the second surface, a total of central angles of the second conversion region is greater than a total of central angles of the penetration region.

5. The light source module according to claim 4, wherein a glass sheet or a diffusion sheet is disposed in the penetration region.

6. A light source module, wherein the light source module is configured to provide an illumination beam, and the light source module comprises a first solid-state light source, a second solid-state light source, and a wavelength conversion wheel, wherein
   the first solid-state light source is configured to provide a first light beam, the first solid-state light source is a blue light source, and the first light beam is a first blue light beam;
   the second solid-state light source is configured to provide a second light beam, and the second solid-state light source is a blue light source, and the second light beam is a second blue light beam; and
   the wavelength conversion wheel is disposed on transmission paths of the first light beam and the second light beam, and the wavelength conversion wheel has a wavelength conversion region and a penetration region, wherein the penetration region allows the first light beam and the second light beam to pass through, and the wavelength conversion region is configured to convert the first light beam and the second light beam to generate a conversion beam, and the penetration region further comprises a first penetration region and a second penetration region, and the first penetration region and the second penetration region are disconnected from each other, wherein the wavelength conversion wheel comprises a substrate, wherein the substrate comprises a first surface and a second surface opposite to the first surface, the wavelength conversion region comprises a first conversion region and a second conversion region, the first conversion region and the second conversion region are respectively located on the first surface and the second surface, the penetration region is connected to the first surface and the second surface, and the wavelength conversion region and the penetration region are disposed by using a symmetry point of the substrate as a reference point, wherein the first conversion region is rationally symmetric by using a reference line as a benchmark, and the penetration region is rationally symmetric by using the reference line as a benchmark.

7. The light source module according to claim 6, wherein the second conversion region is rationally symmetric by using the reference line as a benchmark.

8. The light source module according to claim 6, wherein a transmission direction of the first blue light beam is opposite to a transmission direction of the second blue light beam.

9. The light source module according to claim 6, wherein the first conversion region comprises at least two different wavelength conversion materials, and the wavelength conversion region is configured to convert the blue light beams to generate a red light beam and a yellow light beam.

10. A light source module, wherein the light source module is configured to provide an illumination beam, and the light source module comprises a first solid-state light source, a second solid-state light source, a wavelength conversion wheel, a red light source, a first light combining element, and a second light combining element, wherein
the first solid-state light source is configured to provide a first light beam, the first solid-state light source is a blue light source, and the first light beam is a first blue light beam;
the second solid-state light source is configured to provide a second light beam, and the second solid-state light source is a blue light source, and the second light beam is a second blue light beam;
the wavelength conversion wheel is disposed on transmission paths of the first light beam and the second light beam, and the wavelength conversion wheel has a wavelength conversion region and a penetration region, wherein the penetration region allows the first light beam and the second light beam to pass through, and the wavelength conversion region is configured to convert the first light beam and the second light beam to generate a conversion beam, and the penetration region further comprises a first penetration region and a second penetration region, and the first penetration region and the second penetration region are disconnected from each other, wherein
the wavelength conversion wheel comprises a substrate, wherein the substrate comprises a first surface and a second surface opposite to the first surface, the wavelength conversion region comprises a first conversion region and a second conversion region, the first conversion region and the second conversion region are respectively located on the first surface and the second surface, the penetration region is connected to the first surface and the second surface, and the wavelength conversion region and the penetration region are disposed by using a symmetry point of the substrate as a reference point;
the red light source is configured to provide a red light beam;
the first light combining element is disposed on transmission paths of the second blue light beam, the conversion beam, and the red light beam, and is configured to allow a part of the red light beam to penetrate, and to reflect the other part of the red light beam; and
the second light combining element is disposed on transmission paths of the first blue light beam, the conversion beam, and the other part of the red light beam.

11. The light source module according to claim 10, further comprising:
a light homogenizing element, disposed on transmission paths of the first blue light beam, the second blue light beam, and the yellow light beam, and configured to receive the first blue light beam, the second blue light beam, and the conversion beam.

12. A projection apparatus, comprising a light source module, an imaging element, and a projection lens, wherein
the light source module is configured to provide an illumination beam, and the light source module comprises a first solid-state light source, a second solid-state light source, and a wavelength conversion wheel, wherein
the first solid-state light source is configured to provide a first light beam;
the second solid-state light source is configured to provide a second light beam; and
the wavelength conversion wheel is disposed on transmission paths of the first light beam and the second light beam, and the wavelength conversion wheel has a wavelength conversion region and a penetration region, wherein the penetration region allows the first light beam and the second light beam to pass through, and the wavelength conversion region is configured to convert the light beams to generate a conversion beam, and the wavelength conversion region further comprises a first wavelength conversion region and a second wavelength conversion region, and the penetration region further comprises a first penetration region and a second penetration region, and the first penetration region and the second penetration region are disconnected from each other,
wherein one of the first wavelength conversion region and the second wavelength conversion region is disposed between the first penetration region and the second penetration region and located at one side of the first penetration region and the second penetration region,
the other one of the first wavelength conversion region and the second wavelength conversion region is disposed between the first penetration region and the second penetration region and located at the other side of the first penetration region and the second penetration region,
wherein
the wavelength conversion wheel comprises a substrate, wherein the substrate comprises a first surface and a second surface opposite to the first surface, the wavelength conversion region and the penetration region are disposed on the substrate, the wavelength conversion region comprises a first conversion region and a second conversion region, the first conversion region and the second conversion region are respectively located on the first surface and the second surface, the penetration region is connected to the first surface and the second surface, the wavelength conversion region and the penetration region are disposed by using a symmetry point of the substrate as a reference point, and the light source module provides the illumination beam by operating the first solid-state light source, the second solid-state light source, and the wavelength conversion wheel;

the imaging element is disposed on a transmission path of the illumination beam, and is configured to convert the illumination beam to an image beam; and the projection lens is disposed on a transmission path of the image beam, and is configured to project the image beam onto a projection target.

13. The projection apparatus according to claim 12, wherein the first solid-state light source and the second solid-state light source are blue light sources, and the first light beam and the second light beam are respectively a first blue light beam and a second blue light beam.

14. The projection apparatus according to claim 13, wherein the light source module further comprises:
  a filter wheel, disposed on transmission paths of the first blue light beam, the second blue light beam, and the conversion beam, and configured to receive the first blue light beam, the second blue light beam, and the conversion beam, wherein the conversion beam is a yellow light beam, and the filter wheel generates a red light beam and a green light beam according to the conversion beam.

15. The projection apparatus according to claim 14, wherein the light source module further comprises:
  a light homogenizing element, disposed on transmission paths of the first blue light beam, the second blue light beam, and the conversion beam, and configured to receive the first blue light beam, the second blue light beam, and the conversion beam.

16. A projection apparatus, comprising a light source module, an imaging element, and a projection lens, wherein
  the light source module is configured to provide an illumination beam, and the light source module comprises a first solid-state light source, a second solid-state light source, and a wavelength conversion wheel, wherein
  the first solid-state light source is configured to provide a first light beam, the first solid-state light source is a blue light source, and the first light beam is a first blue light beam;
  the second solid-state light source is configured to provide a second light beam, and the second solid-state light source is a blue light source, and the second light beam is a second blue light beam; and
  the wavelength conversion wheel is disposed on transmission paths of the first light beam and the second light beam, and the wavelength conversion wheel has a wavelength conversion region and a penetration region, wherein the penetration region allows the first light beam and the second light beam to pass through, and the wavelength conversion region is configured to convert the light beams to generate a conversion beam, and the penetration region further comprises a first penetration region and a second penetration region, and the first penetration region and the second penetration region are disconnected from each other, wherein
  the wavelength conversion wheel comprises a substrate, wherein the substrate comprises a first surface and a second surface opposite to the first surface, the wavelength conversion region and the penetration region are disposed on the substrate, the wavelength conversion region comprises a first conversion region and a second conversion region, the first conversion region and the second conversion region are respectively located on the first surface and the second surface, the penetration region is connected to the first surface and the second surface, the wavelength conversion region and the penetration region are disposed by using a symmetry point of the substrate as a reference point, and the light source module provides the illumination beam by operating the first solid-state light source, the second solid-state light source, and the wavelength conversion wheel, wherein the first conversion region is rotationally symmetric by using a reference line as a benchmark, the penetration region is rotationally symmetric by using the reference line as a benchmark, and the reference line is parallel to the transmission paths of the first blue light beam and the second blue light beam;
  the imaging element is disposed on a transmission path of the illumination beam, and is configured to convert the illumination beam to an image beam; and
  the projection lens is disposed on a transmission path of the image beam, and is configured to project the image beam onto a projection target.

* * * * *